A. J. BOS.
COMBINED WATER HEATER AND OVEN.
APPLICATION FILED JAN. 6, 1916.
1,185,051.  Patented May 30, 1916.
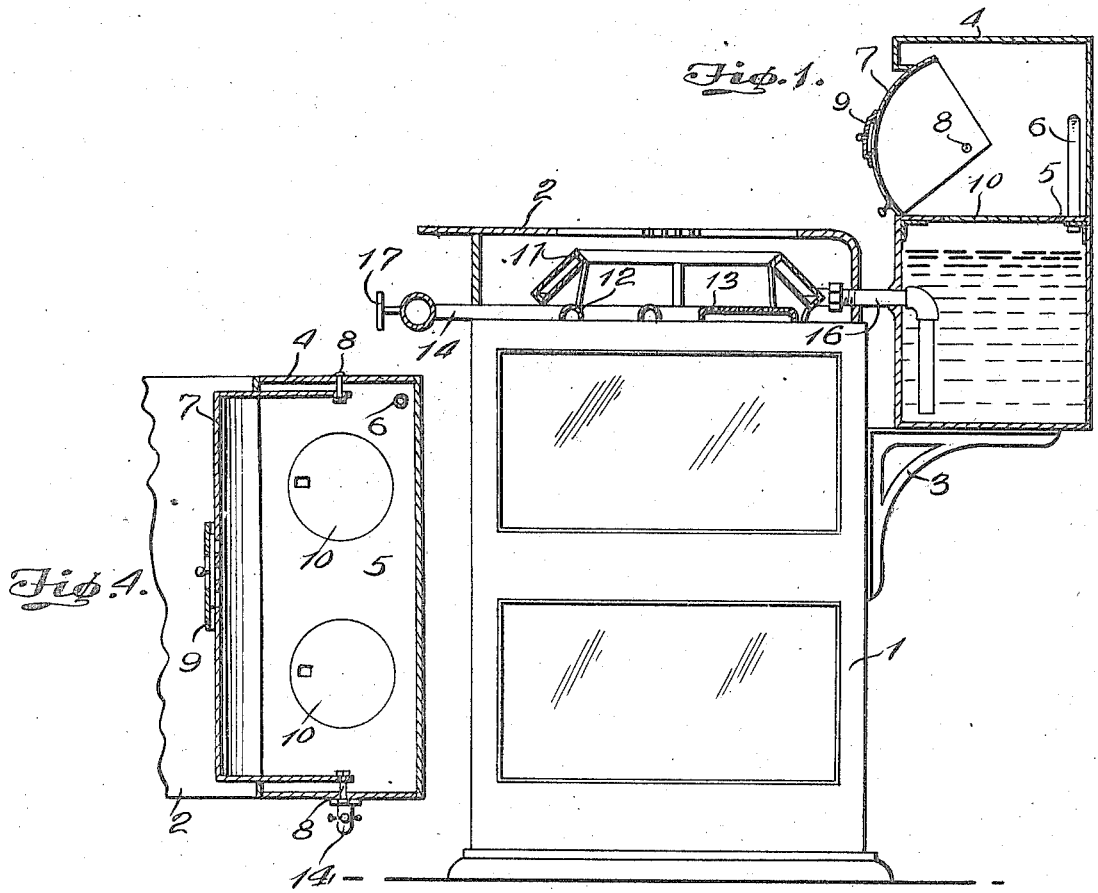
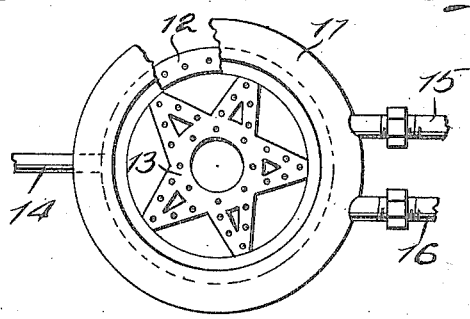
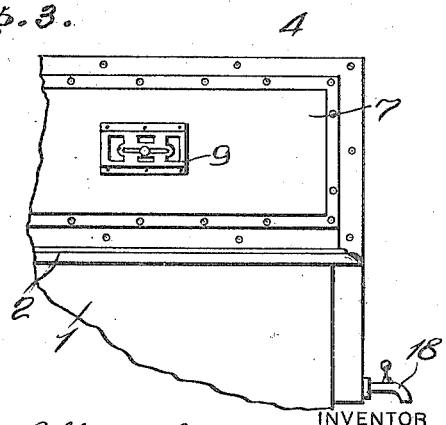
WITNESSES
Edw. S. Hall.
J. P. Campbell.
INVENTOR
Albert J. Bos.
BY Richard Owen
ATTORNEY

UNITED STATES PATENT OFFICE.

ALBERT J. BOS, OF EVANSVILLE, INDIANA.

COMBINED WATER-HEATER AND OVEN.

1,185,051.

Specification of Letters Patent.    Patented May 30, 1916.

Application filed January 6, 1916. Serial No. 70,687.

*To all whom it may concern:*

Be it known that I, ALBERT J. Bos, a citizen of the United States, residing at Evansville, in the county of Vanderburg and State of Indiana, have invented certain new and useful Improvements in Combined Water-Heaters and Ovens, of which the following is a specification.

My invention relates to new and useful improvements in a combined water heater and oven.

The primary object of the invention is the provision of means for heating water and the provision of an oven for keeping articles of food warm or for cooking the same.

A further object of the invention is the provision of an oven mounted over a water receptacle whereby the steam generated in the water receptacle will heat the articles in the oven.

A still further object of the invention is the provision of a water heater of such construction that articles may be cooked thereover.

Another object is the provision for drawing the water from the water receptacle and a discharge for the steam in the oven.

With these and other objects in view the invention consists in the novel details of construction and arrangement of parts which will be more clearly understood from the following description and drawings, in which, Figure 1 is a side elevation of a stove with my water heater oven attached, the heater and oven being shown in vertical section, Fig. 2 is a fragmental plan view of the burner, Fig. 3 is a fragmental detail showing the parts of the oven, and Fig. 4 is a longitudinal section view through the oven.

In the drawings the numeral 1 indicates a stove, preferably a gas stove, of ordinary construction having the usual top plate 2 provided with openings through which the heat may pass to the receptacles upon the top of the stove. A bracket 3 is secured to the rear of the stove and is adapted to support the oven 4 which is divided into two compartments by means of the central dividing plate 5. The lower compartment is adapted to be used as a water receptacle and the upper compartment for heating food or keeping the same warm. A pipe 6 is connected to the division plate 5 and allows for the passage of steam from the lower compartment. The end of the pipe 6 passes through the end of the oven, and is provided with a valve (not shown). The front of the upper compartment is open and a door 7 has its rearwardly bent portions or ears pivotally connected within the compartment at 8 and is adapted to close the opening. This cover 7 is provided with a sliding damper 9 of ordinary construction and the purpose of which will be presently described.

Openings are formed in the division plate 5 and are adapted to be closed by means of the plate 10, as is clearly shown in Fig. 4 of the drawings. The purpose of these openings and removable plates will be later described.

My water heater comprises a circular tubing indicated at 11 and as is clearly shown this tubing is provided with an annular passage and is set at an angle, as is clearly shown in Fig. 1 of the drawings. A burner is located beneath the tubing and comprises a circular perforated ring 12 with a star-shaped casting 13 therein. It will be understood that the star-shaped casting as well as the ring 12 is perforated for the gas to pass therethrough. The gas is admitted to the burner by means of the pipe 14, as is more clearly shown in Figs. 1 and 2 of the drawings. Water is admitted to the tubing 11 by the pipe indicated at 15 and is discharged into the lower compartment of the oven by the pipe 16. The pipe 16 extends to a point near the bottom of the water compartment, as is clearly shown in Fig. 1 of the drawings, whereby the heated water is discharged toward the bottom of the compartment. A turning-plug is indicated at 17 for regulating the flow of gas and a faucet is indicated at 18 for withdrawing the water from the lower compartment of the oven.

While I have described the bracket 3 and oven as being mounted upon the back of the stove, it is understood that it might equally as well be used on either side of the stove.

From the above detailed description of the construction, it is thought that the many advantages of my construction will be understood. It will be seen that I have provided a combined water heater and oven which are simple and inexpensive in construction and which may be readily attached to any stove now in use. The gas from the ring 12 will be directed against the underside of the tubing 11 which is at an angle, thereby readily heating the water which passes through the tubing. The flames from the star-shaped casting 13 pass through the center of the tubing 11 and are used for heating the articles upon the top of the stove. It will therefore be seen that the heating of the water in no way interferes with cooking upon the top of the stove. The heated water passes into the lower compartment of the oven 4 and the steam therefrom passes through the pipe 6. The articles to be kept warm are placed in the upper compartment and the steam generated in the water compartment keeps them warm. The cover 7 is swung upon the pivot point 8 for placing the articles within the compartment. The damper 9 may be opened to allow the steam to escape or closed when it is desired to retain the steam within the compartment. If it is desired to cook by means of the steam, the plates 10 covering the openings in the division plate 5 may be removed and the receptacle containing the food to be cooked placed over the openings. Water may be withdrawn from the lower compartment by means of the faucet 18 and as previously described the flow of gas is regulated by means of the turning-plug 17.

Having fully described my invention what I claim as new and desire to secure by Letters Patent is:

1. In a device of the character described, a casing, a partition plate arranged horizontally therein dividing the same into an upper and a lower compartment, the lower compartment having an inlet and an outlet thereby providing a reservoir, said partition plate having spaced openings, removable lids for said openings, said upper compartment forming a cooking chamber and said upper compartment provided with a door opening immediately above said partition plate; in combination with a door pivotally mounted in said cooking chamber adapted to maintain a substantially air tight connection with the walls of said door opening, when in a closed position, and to maintain the substantially air tight fit when in an open position except at the opening provided for the introduction or the withdrawal of a cooking utensil, and further forming a heated air trap adjacent the upper end of said cooking chamber.

2. In a device of the character described, a body casing, a partition plate arranged horizontally therein and dividing the same into an upper and a lower compartment, said plate having spaced openings and removable lids therefor, the lower compartment having an inlet and an outlet thereby forming a reservoir, the upper compartment provided with a door opening, said door opening terminating short of the respective sides of said compartment and being spaced from the top thereof, and the front wall of the upper compartment having an inturned flange disposed at the upper edge of said door opening; in combination with a door member having rearwardly directed ears, means engaging said ears pivotally supporting said door, said ears fitting the end walls of said opening and the outer face of said door fitting the inner edge of said flange, and said door member normally resting on said partition plate and closing said opening.

In testimony whereof I affix my signature in presence of two witnesses.

ALBERT J. BOS.

Witnesses:
ALBERT J. VENEMAN,
ANNA H. VENEMAN.